G. T. TRUNDLE, JR., ET AL 1,513,297

PAPER BAG MAKING MACHINE

Filed Oct. 31, 1921    9 Sheets-Sheet 6

Patented Oct. 28, 1924.

1,513,297

UNITED STATES PATENT OFFICE.

GEORGE T. TRUNDLE, JR., OF CLEVELAND, AND BURTON G. CARLSON, OF CLEVELAND HEIGHTS, OHIO, ASSIGNORS TO THE ADAMS BAG COMPANY, OF CLEVELAND, OHIO, A CORPORATION OF OHIO.

PAPER-BAG-MAKING MACHINE.

Application filed October 31, 1921. Serial No. 511,638.

*To all whom it may concern:*

Be it known that we, GEORGE T. TRUNDLE, Jr., and BURTON G. CARLSON, citizens of the United States, residing at 3153 Sycamore Road, Cleveland, Ohio, and 1705 Belmar Road, Cleveland Heights, Ohio, respectively, in the county of Cuyahoga, have invented a certain new and useful Improvement in Paper-Bag-Making Machines, of which the following is a full, clear, and exact description, reference being had to the accompanying drawings.

This invention is directed to improvements in paper bag making machines, and is more particularly concerned with the type of machine which produces a double end closed bag, or so-called valve bag, such as is used in packaging cement, etc.

In constructing bag machinery which is adapted to produce double end closed bags with one end having a valve fold, the general practice has been to form the tube or body of the bag on one machine, then fold and seal the bottom on a second machine and finally form the top or valve end of the bag on a third machine. As this method requires three machines, the use of considerable floor space is unavoidable. A further disadvantage in this arrangement is the loss of considerable time in handling the semi-completed bag when transporting from one machine to another. In the valve type of bag it is desirable to print the major portion of the surfaces thereof in a variety of colors. To accomplish this printing on a bag machine, however, would retard its productive capacity. A more efficient method would be to form the tubes and print them after which they may be fed to a bag machine.

The general object of the present invention therefore, is the provision of a bag making machine adapted to close both ends of a previously formed tube as the tube is conveyed along a continuous pathway; the bottom forming and top forming mechanism being such that only the use of simple, mechanical means are involved in producing the finished product. The arrangement is such that the tubes may be received at one end of the machine and be continuously conveyed along the path during a period in which the bottom formation of the bag is being completed on the foremost end of the tube after which the tube is reversed while still traveling in the pathway, and the other end of the tube is closed by top forming mechanism which is likewise adapted to operate on a foremost end of the tube.

A more specific object of the present invention is the provision of a combined top and bottom forming mechanism including tube reversing means whereby the bottom folds of a so-called diamond bottom bag may be effected and the bottom completed by rotary mechanism after which the half completed bag may be reversed and fed to other rotary folding and forming mechanisms which complete the top or valve end of the bag and thereafter eject the same into a suitable stacking magazine; all of the mechanisms being associated in a common machine structure and driven in synchronism from a common motive source.

A further object of the present invention is the incorporation of novel tube opening and folding mechanisms in such a machine which involves the use of a minimum number of movable elements directed to the flat folding of the top and bottom plies of the bag at a high rate of speed.

Other objects will become apparent from the following description hereinafter set forth which refers to the accompanying drawings. The essential characteristics are summarized in the claims.

In the drawings, Fig. 3 is an enlarged cross sectional elevation of the bottom forming mechanism; while Fig. 5 is an irregular transverse cross sectional elevation substantially along the line 5—5 of Fig. 3 with a pasting element, however, rotated 90 degrees from the position shown in Fig. 3; while

In Fig. 11 we have illustrated the shape of the tube when fed to the machine; Fig. 12 indicates the first operations which are performed upon the tube by the diagonal creasing and feeding roll; Fig. 13 illustrates the formation of the bottom after the spreading mechanism has separated the two plies of the tube and brought about the diagonal folding or defining of the diamond edges of the bottom; Fig. 14 shows the outline of the imprinted adhesive; Fig. 15 shows the position of the two transverse creases which define two sides of the bottom; while

Figure 1:
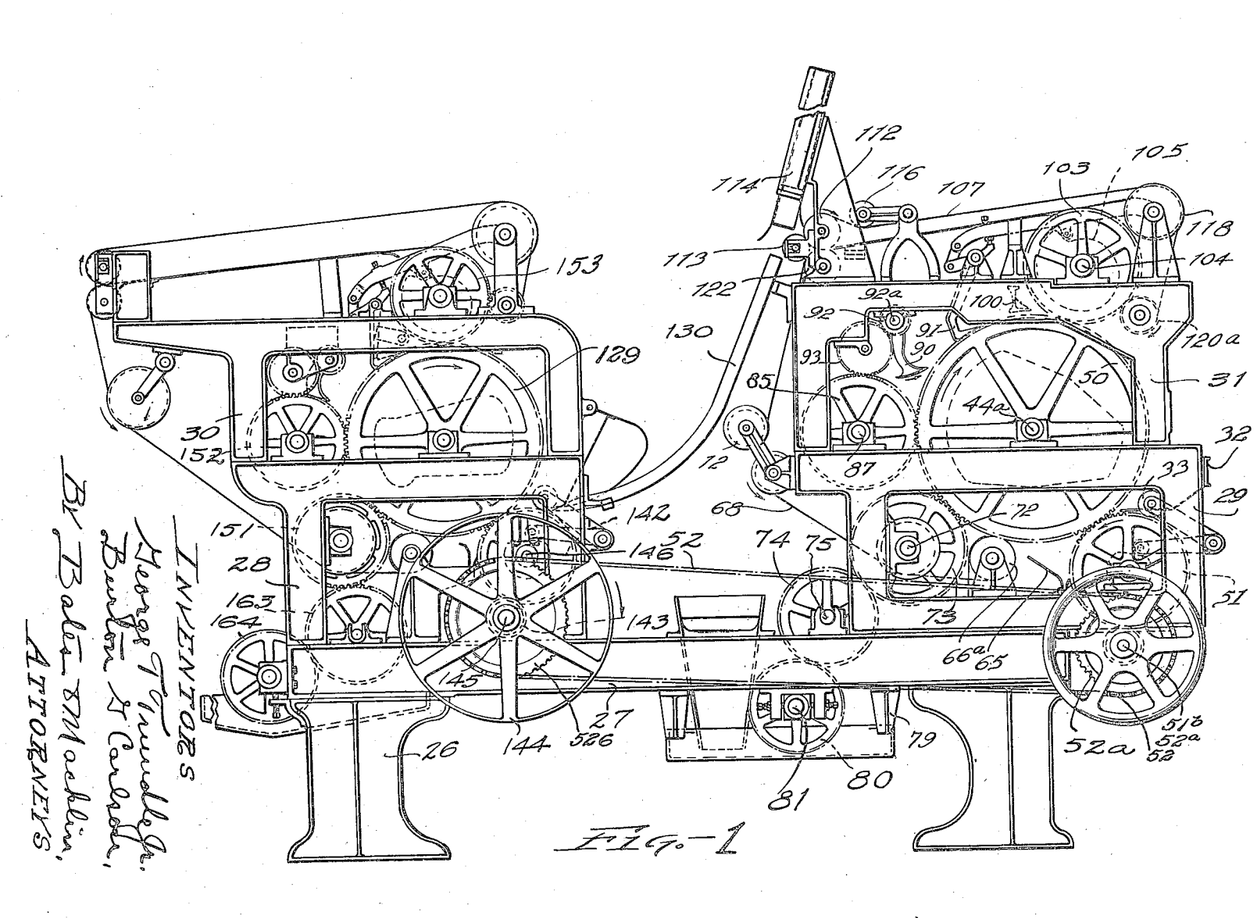
Fig. 1 is a side elevation of the machine.
Figure 2:
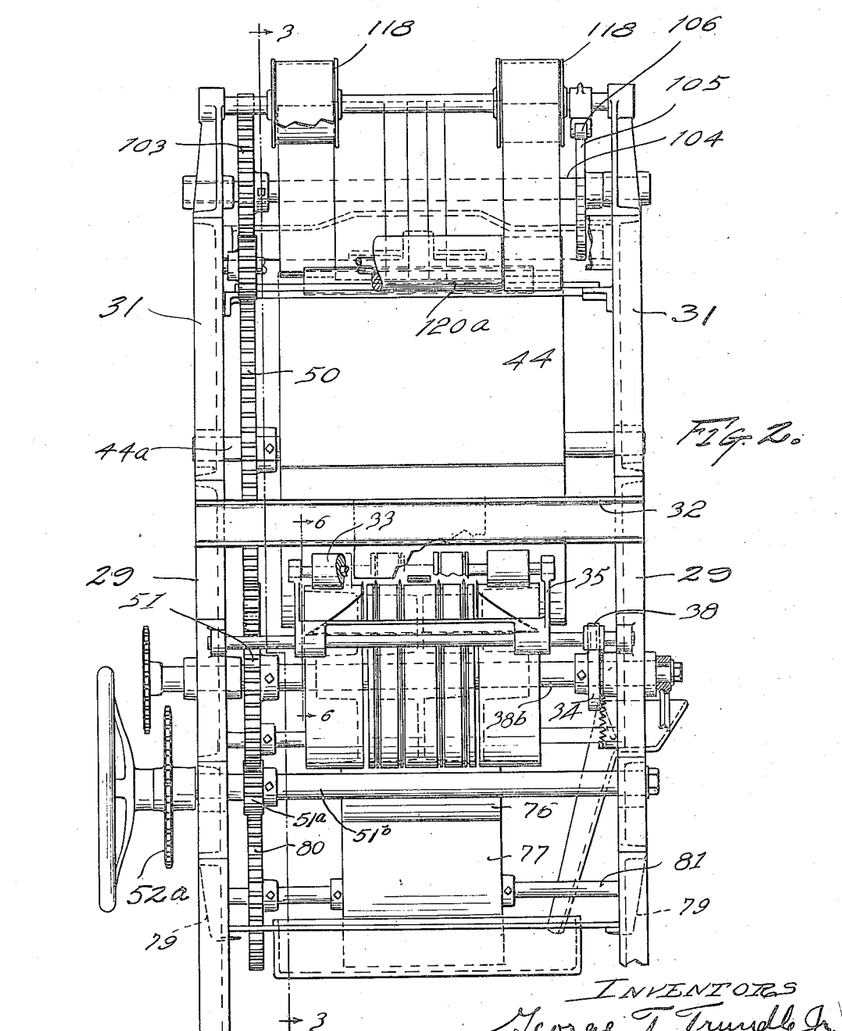
Fig. 2 is a fragmentary end elevation of the machine looking at the tube receiving end thereof.
Figure 3:
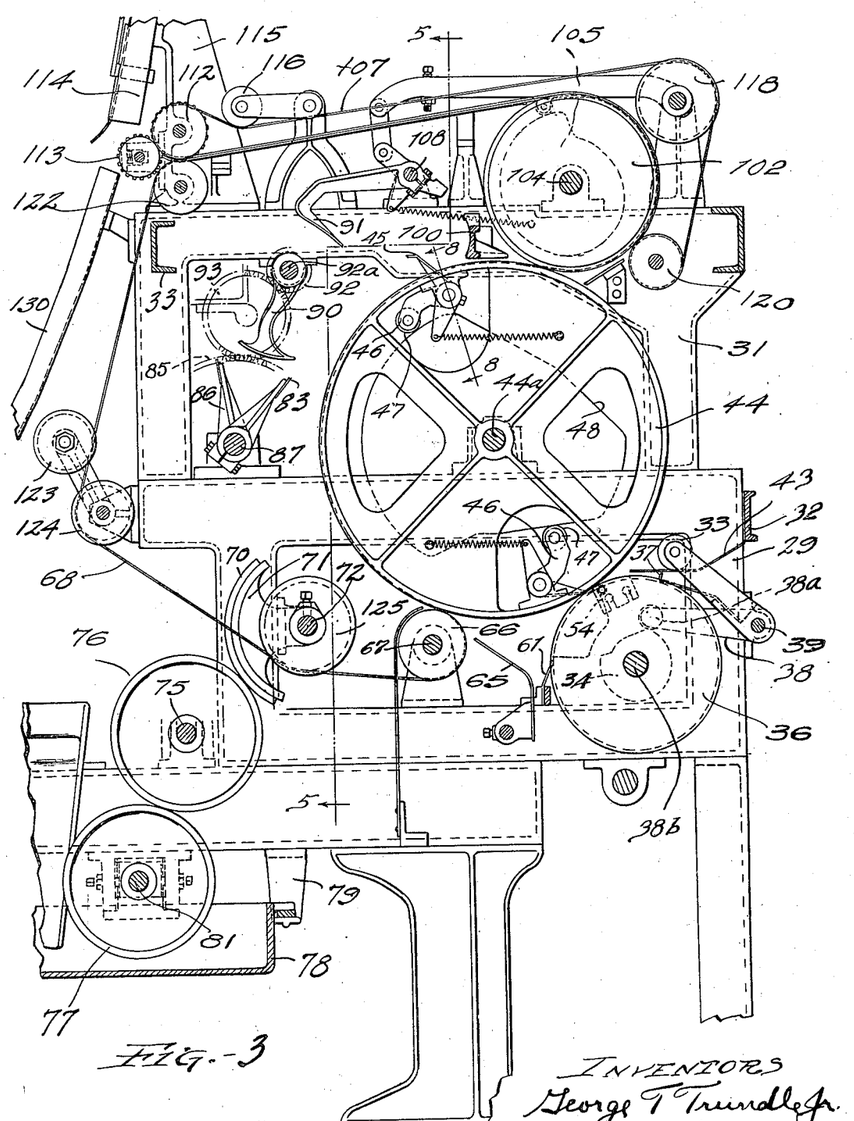
Figure 4:
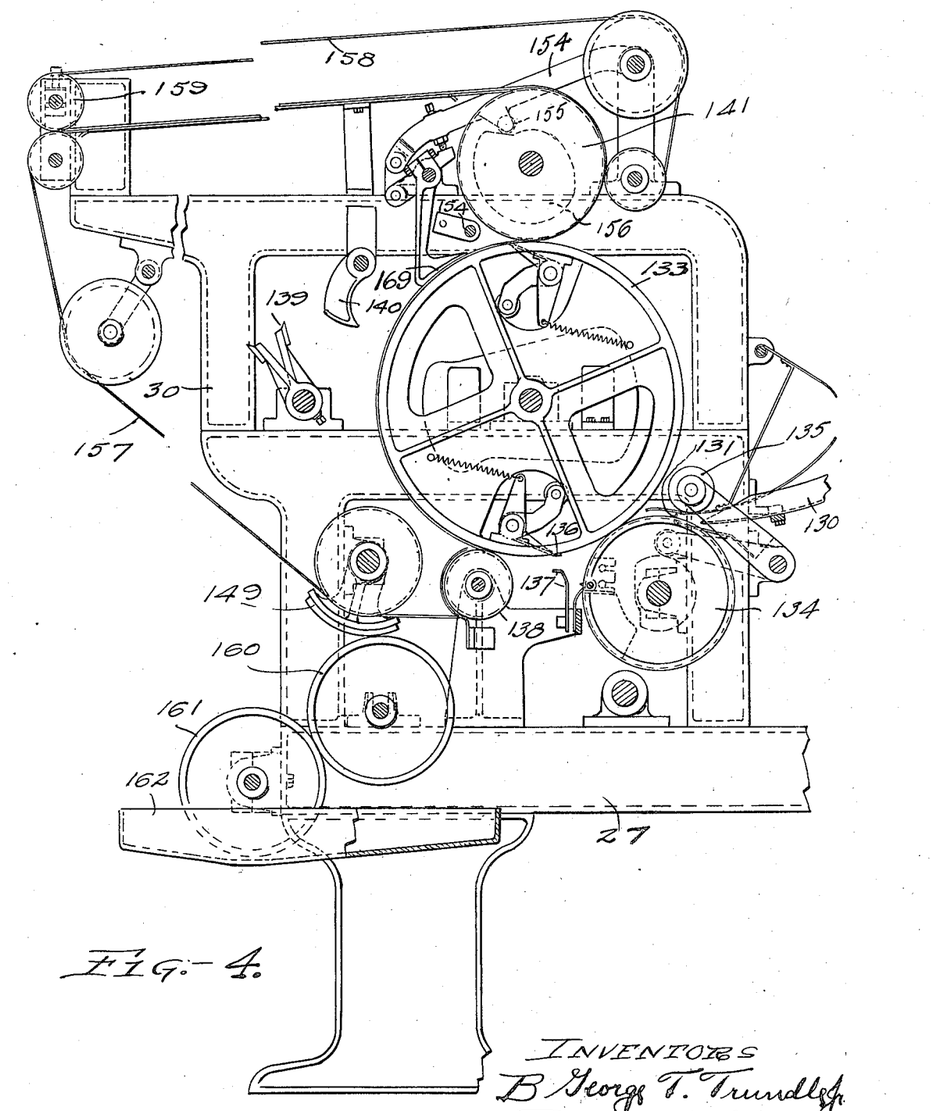
Fig. 4 is a similar view of the top or valve forming mechanism.
Figure 5:
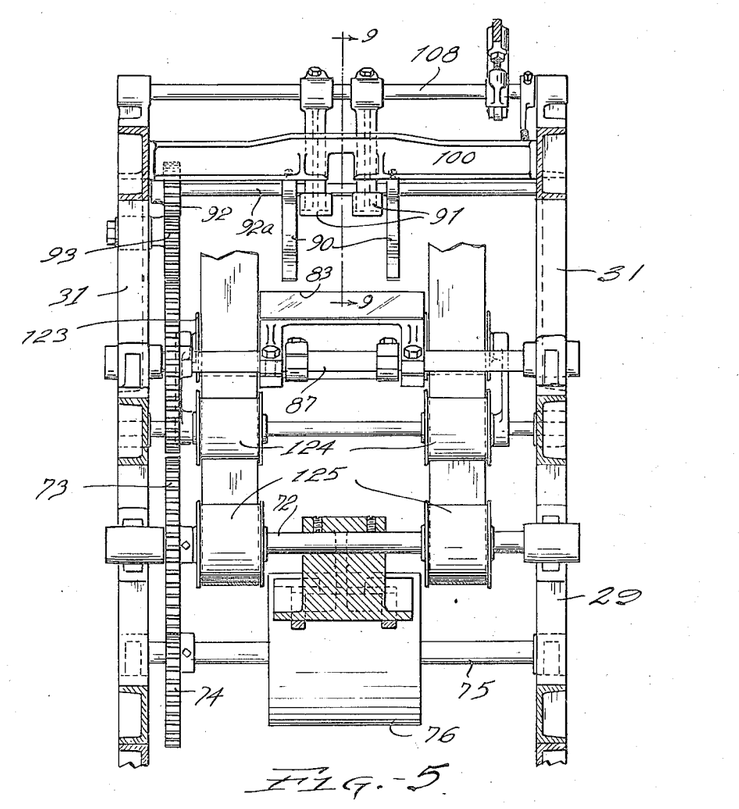

The construction of the machine as illustrated in Fig. 1 may be economically obtained by arranging the bottom forming and top forming mechanisms about rotary drums upon which the bag body or tube is adapted to be conveyed while the various creasing, folding and pasting operations are effected. Hence the construction may be in the nature of a complete unit with the various mechanisms disposed in co-operative relation between the side members of a machine frame comprised of standards or legs, 26, which support a bed 27 having intermediate side frame members 28 and 29 surmounted thereon. These frame members may support top frame members 30 and 31 respectively. The latter members may, if desired, be made integral with the first named frame members but for convenience in manufacturing, we prefer to have the side frame members assembled as described.

The upper frame members may have flanged edges of sufficient width to support suitable bearing blocks in which the rotating shafts of the various mechanisms may be mounted. The frame members may be maintained in properly spaced relation on the machine bed 27 by suitable transverse spacing members such as are indicated at 32.

Figure 6:
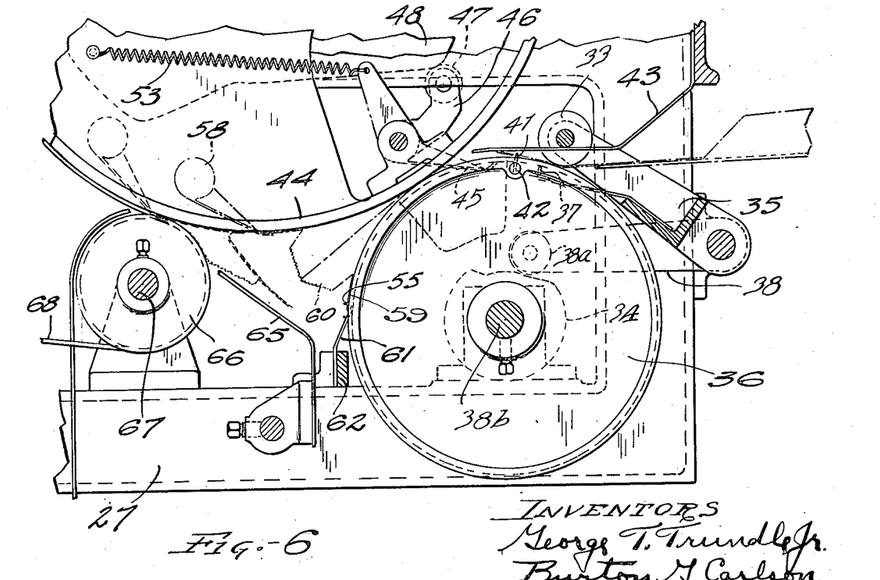
Fig. 6 is a fragmentary cross sectional view taken transversely of the feed roll and tube spreading mechanisms.
Figure 7:
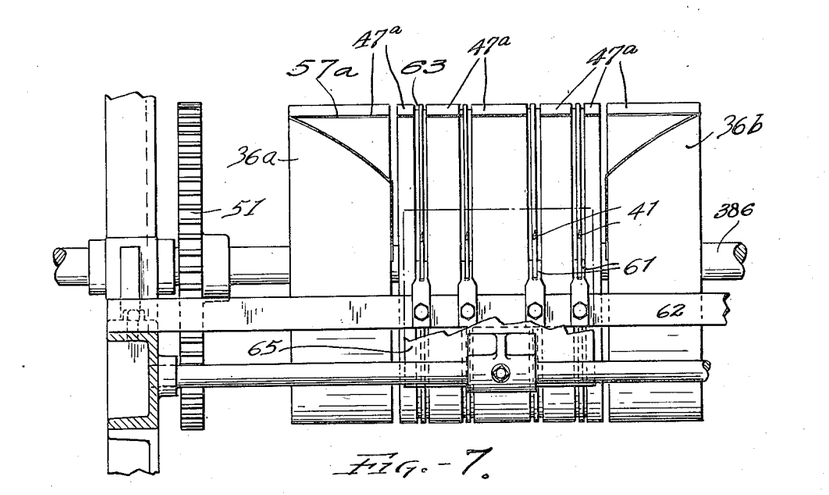
Fig. 7 is a fragmentary view of the diagonal creasing and tube feeding roll and ply stripping means associated therewith.
Figure 8:
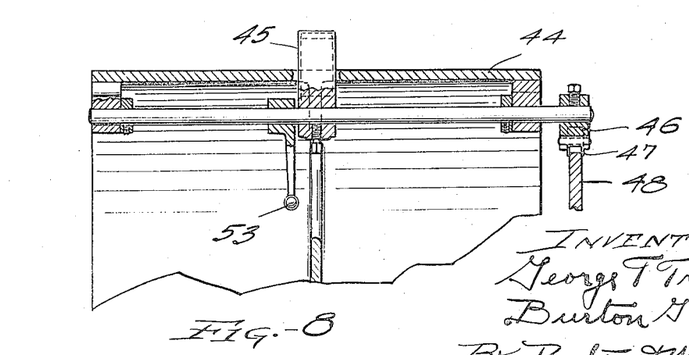
Fig. 8 is a cross sectional view taken substantially along the line 8—8 of Fig. 3 showing the means for positively gripping the top ply of the tube when the tube is fed into the machine.

The particular elements of the forming mechanism which first act upon the tube are illustrated on an enlarged scale in Fig. 6. In this view a pair of tube stops 37 are shown as being positioned on each side of a feed drum 36 and supported on a pivotally mounted frame 35 which is disposed adjacent the feed drum. These stops are adapted to properly engage one end of the tube as it is fed into the machine by automatic means, (not shown.)

Friction feed rollers 33 may be carried toward and away from the drum 36 by the frame 35. Since the stop members are rigidly mounted on the friction roller frame, the engaging end 37 thereof drops out of contact with the end of the tube as the rollers are permitted to drop downwardly by a cam 34 coacting with a follower 38ᵃ mounted on arm 38; the arm being in rigid relation with the frame.

We prefer to have these stop members disposed on each side of the feed drum 36 at sufficient distance therefrom to properly clear the same when dropped down to release the tube when it is engaged by the rollers 33 and feed drum 36. Hence, when the follower reaches the depression formed in the cam 34, the frame 35 will rotate on the pivotal mounting 39, and the friction rollers 33 will engage the top ply of the tube with sufficient force to cause a perforation of the end of the tube by pins 41 which are rigidly carried by an adjustable rod 42 mounted on the feed drum 36. The friction rollers may be comprised of any resilient substance, such as rubber and may be slit about the perimeters to permit the pins to extend therein as they penetrate the plies of the bag tube. A guide plate 43 may be secured to the frame of the machine and extend inwardly over the feed drum and between the friction rollers and the pins thereby serving to retain the tube in engagement with the pins as the tube is fed into the machine and onto the surface of a conveying drum 44.

It will be understood from the following description that all of the mechanisms which act upon the tube may be disposed in various radial positions about the drum 44 and may coact therewith in effecting the various folding and forming operations that complete the bottom of the bag. The drum 44 should therefore, be of considerable size to obtain sufficient clearance between these various mechanisms, and for convenience may have a circumference of such length as to convey two tubes per one revolution thereof. Hence two sets of tube gripping mechanism should be carried by the drum and be diametrically disposed in such a manner as to grip the upper plies of the successive tubes as they are fed into the machine.

The tubes may be positively positioned on the drum by gripper fingers 45 which are controlled by gripper actuating members disposed on the inside of the conveying drum. These members may be comprised of cam levers 46, rollers 47 and cam 48; the latter member being non-rotatably mounted on the side frame members 29 but coaxially with the drum shaft 44$^a$. As the tube is advanced into the machine by the feed roll 36, one of the grippers, which is moving in timed relation therewith, is brought into engagement with a projecting portion 48$^a$ which is formed on the upper ply thereof.

The drum 44 and shaft 44$^a$ may be rotated by a suitable gear 50 disposed between one side of the machine frame and the drum and driven by a gear 51 rigidly secured to the feed drum shaft 38$^b$. The last named gear may be driven by a pinion 51$^a$ which is mounted on a sprocket shaft 51$^b$ driven by a chain 52 and sprockets 52$^a$ and 52$^b$; the latter named members serving to actuate the bottom forming and top forming mechanisms in synchronism.

The gear 50 may drive a train of gears which are adapted to actuate the various mechanisms that effect the successive steps in forming the bottom of the bag. As the feed drum 36 and gear 51, which meshes with gear 50, are mounted on the same shaft the properly timed engagement of the finger 45 with the tube may therefore be brought about by arranging the contour of the cam 48 so that the cam follower 47 and lever 46 will be shifted inwardly by a spring 53 thus causing the finger 45 to grip the end of the tube.

Subsequent to the gripping of the end of the tube by the finger 45 a slitting operation is performed by shearing members 54, rigidly carried by crease forming drums 36$^a$ and 36$^b$, which are positioned on each side of the feed drum 36. The shearing edges of the members 54 rotate into engagement with corresponding shearing edges formed in the face of the conveying drum 44 and cause longitudinal slitting of the bag. Thus the longitudinal slits 55 are formed in the tube and terminate at the end of the diagonal creases 56 which are immediately thereafter formed in the tube by suitable diagonal crease forming ridges 57$^a$ carried by the same drums and mesh with or are complementary to diagonal grooves formed in the face of the conveying drum 44. A transverse crease 57 may likewise be formed in both plies of the tube by suitable transverse creasing blades 47$^a$ which extend across and project from the face of the feed drum 36 and the drums 36$^a$ and 36$^b$.

Figures 11, 12, 13, 14, 15:
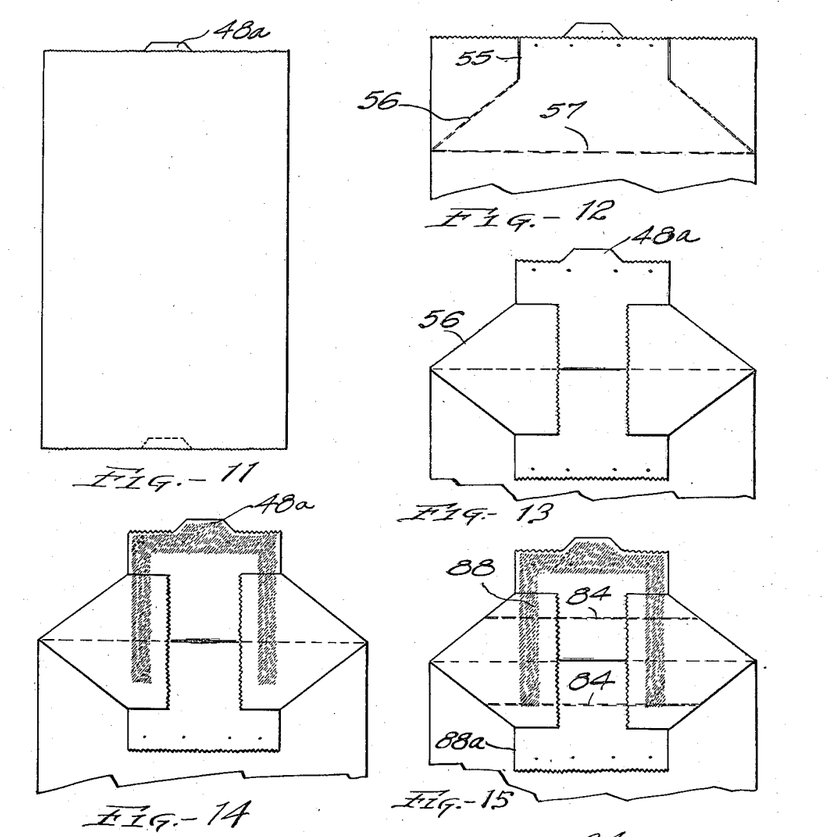
Figures 16, 17:
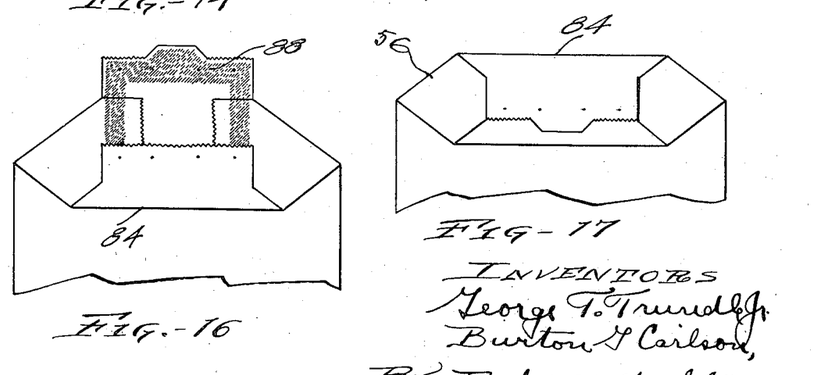
Fig. 16 illustrates the condition of the bottom at the consummation of the tucking operation.
Fig. 17 illustrates the completed flat fold which closes and seals one end of the tube.
Figure 18:
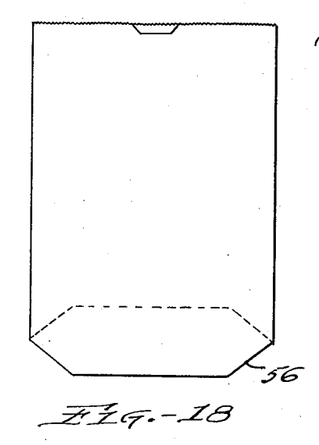
In Figs. 18 to 24 the various successive steps in the formation of the valve end or top of the bag are illustrated, the folds are the same in shape but the proportions are decreased to obtain a valve opening on one side of the folded top which is of sufficient width for the ready filling of the bag but small enough to prevent leaking of the bag after the same is filled.
Figure 19:
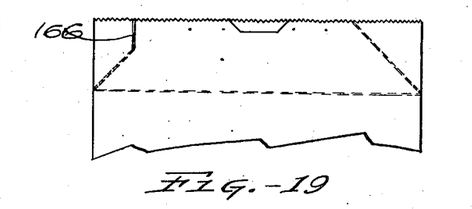
Figure 20:
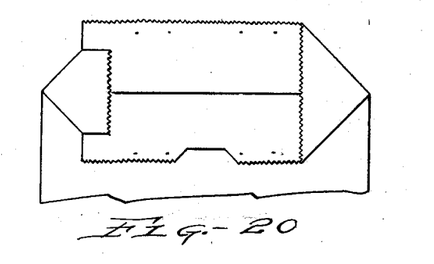
Figure 21:
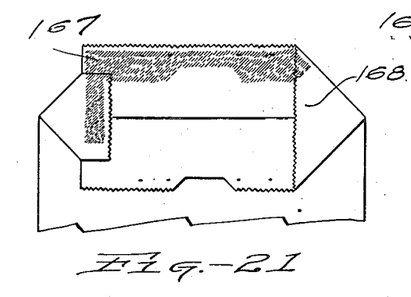

It will be noted that before the complete length of the tube has been fed into the machine, the longitudinal slits, the transverse crease and the diagonal creases have been effected and the tube is thus prepared for the spreading or opening of the plies to bring about the formation of the flat fold, as illustrated in Fig. 13. This fold may be effected in a manner which is well known in the art of bag making and consists in drawing the two tube plies in opposite directions, thereby causing an inward collapsing or transverse folding of the side edges of the tube.

Subsequent positions of the feed finger 45 are indicated in dot and dash lines. In position 58, the end of the top ply of the tube is retained in contact with the drum surface, while the bottom ply of the tube is drawn downwardly by the pins, as indicated by their dot and dash position at 55. The sides of the tube are illustrated at 60 as folding inwardly toward the center of the tube. The stripper members 61 may be mounted transversely of the face of the feed drum and rigid with the bridge 62. The bridge is secured to the side frame members 29 and is adjustably arranged to support the strippers which may extend upwardly at a slight angle to the vertical tangent of the drum. The upper ends of these stripper members may extend inwardly into the face thereof and slidably engage the drum in suitable grooves 63 formed adjacent the feed pins 41. The ends of these stripper fingers are thus permitted to extend beneath the end of the bottom ply of the bag as the same is drawn downwardly by the feed roller 36.

The bottom ply will therefore slide along the upper face of these stripper fingers and be raised out of engagement with the feed pins 41, thus freeing the end of the lower ply of the tube.

After the flat or diamond fold has been started by the opening of the tube end, an adjustable guide plate 65 retards the upward springing movement of the end of the bottom ply as the tube is moved by the conveying drum 44 toward the pressure roll 66. Hence as the opened end of the tube is drawn between the roll 66 and the conveying drum 44, the first fold, as illustrated in Fig. 13, is completed.

The pressure roll 66 may be mounted on a rotatable shaft 67. This shaft also serves as a support for pulleys 66$^a$ of the same diameter as the pressure roll and which guide the retaining straps or belts 68 disposed on each side of the conveying drum 44. These belts are adapted to engage the side edges of the tube, leaving the major portion of the center thereof free to be acted upon by the various mechanisms hereafter described. Sufficient tension should be maintained on the conveyer belts 68 to retain the tube in intimate contact with the surface of the conveyer drum 44 to prevent slippage thereof. After the conveyer belts engage the sides of the tube, the gripper finger 45 may be released and swung out of engagement therewith.

The bottom fold is now in condition for the application of an adhesive or paste which may be applied by an arcuate paste imprinting form indicated at 70. The form may have a contour, the plan development of which corresponds to the shaded pasted area of the tube, as indicated in Fig. 14. The rotary arm 71 and shaft 72 may be positively driven by a gear 73 meshing with the large gear 50. This gear may drive a similar gear 74 carried by the shaft 75 which also carries a removable paste transferring roll 76. The latter roll is maintained in yieldable engagement with a paste pot roll 77 so mounted that the lower portion thereof may be disposed in a paste pot 78 secured by brackets 79 to the bed of the machine. The paste pot roll is driven by a gear 80 on the paste pot shaft 81 and which is disposed to one side of the paste pot. All of the foregoing rolls are arranged to make two revolutions per one revolution of the conveying drum and are disposed centrally of the retaining belts 68.

After the adhesive has been applied by the paste imprinting form, adjustable creasing blades 83 rotate into compressive engagement with the tube and effect the transverse creases 84, as indicated in Fig. 15. These blades may be carried by adjustable arms mounted on the rotatable shaft 87, the shaft being driven by a gear 85 which is also driven by the large gear 50. Thus the blades may be brought into properly timed contact with the tube and in co-ordination with grooves 83$^a$ formed in the face of the conveying drum 44 with the result that the flaps 88 (which are not engaged by the retaining belts 58) will project from the face of the drum at a slight angle due to the distortion of the fibers of the tube along these creased lines which also define the side edges of the bag.

Figure 9:
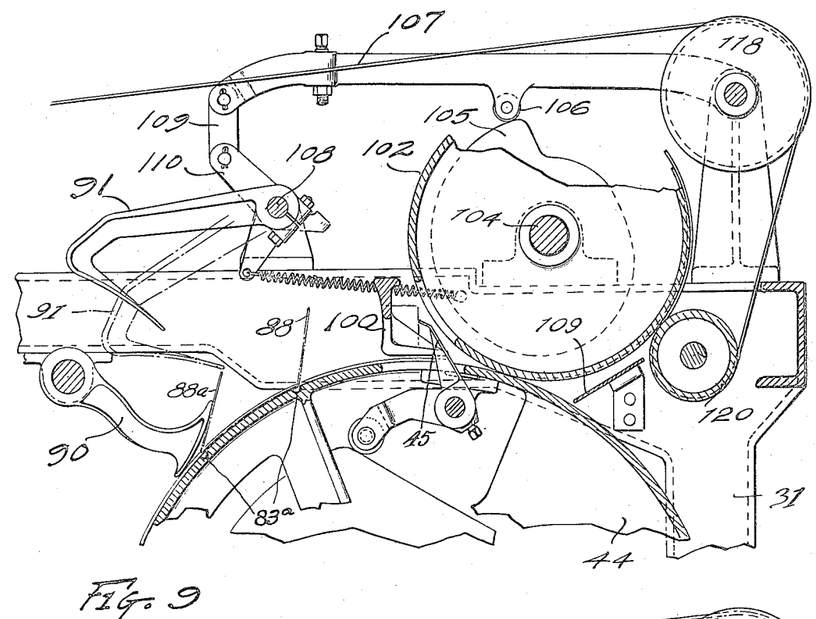
Figs. 9 and 10 are enlarged cross sectional elevations illustrating the means for tucking and forming the final folds of the bag bottom.

The final folding operations required to complete the bottom of the bag consists in turning the flap 38$^a$ about the crease 84 and immediately thereafter folding the outer flap 88 into overlapping relation therewith. To consummate these operations at a speed commensurate with the productive capacity of the foregoing described mechanisms we have provided novel means driven in synchronism with the conveying drum which is comprised of a rotatable tucking member 90 and an intermittently movable fold retaining member 91. The rotatable member is actuated in timed relation with the drum by a small pinion 92 mounted on a shaft member 92$^a$, upon which the tucking member 90 is carried. An intermediate gear 93 may engage the gear 88 and drive the pinion 92; the size of the respective gears being such that the tucking arm 90 will be rotated a number of times while the conveying drum is making one revolution. The outer end of the tucking arm 90 may clear the surface of the conveying drum a slight distance and be of such contour that as the tube is advanced by the drum 44, the edge thereof will engage the under surface of the protruding flap 88$^a$ and fold it through substantially 150 degrees. The rotation of the tucking arm may be at such speed that the engaging of the tube by the tucking arm is effected several times as the bottom fold is passing the tucking mechanism. The flap is thus prepared for proper engagement with the reciprocating fold retaining shoe 91 which advances toward the surface of the conveying drum at a considerable less speed than the speed of the rotatable member. This member engages the edge of the flap 88$^a$ as indicated by the dot and dash position illustrated in Fig. 9 after which it overtakes the fold and completes it by an accelerated follow-up movement which causes the shoe to effectively retain the flap 88$^a$ in the final folded position as the tube advances.

As the tube progresses from beneath the retaining shoe the protruding flap 88 is engaged by a stationary folding member 100 which tends to retard the movement of the flap and swings it through substantially 180 degrees and into contact with the upper surface of the flap 88$^a$. It will be noted that the members 90, 91 and 100 act upon the unpasted surface of the bottom flaps. The final pressing of the bottom formation is effected by the large pressure roll 102 which is positively driven by a gear 103 rigidly mounted on the pressure roll shaft 104.

To obtain an accelerating downward movement of the fold retaining shoe 91, we have provided a cam 105 having the proper contour to effect the downward movement of a roller 106 which is intermediately mounted on the arm 107. The latter member actuates a rocker shaft 108 through a connecting link 109 and a lever 110 rigidly mounted thereon. The position of the rocker shaft is such that the member 91 may be mounted thereon and reciprocate toward and away from the surface of the conveying drum without interfering with the rotatable movement of the tucking arm 90.

Figure 10:
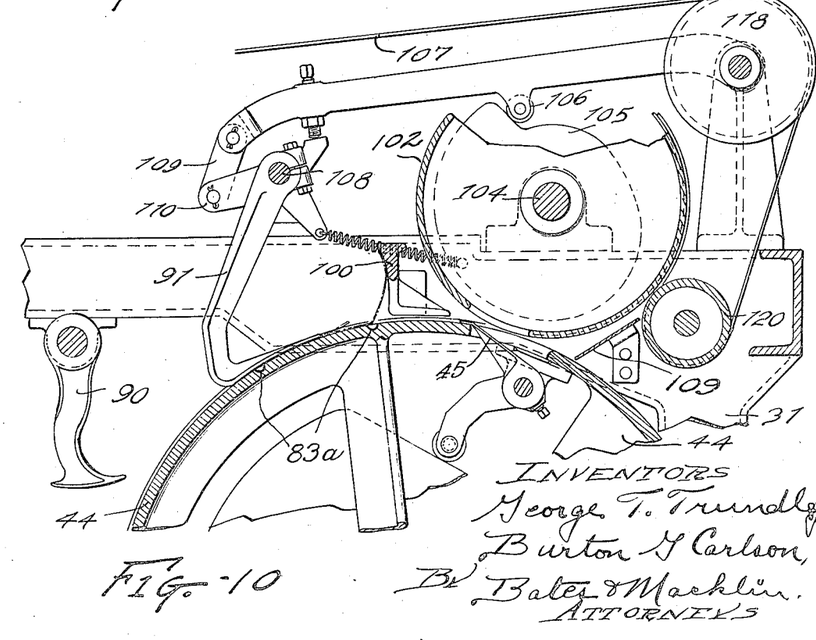

In Fig. 10 the foregoing described tucking mechanism is illustrated as effecting the final folding of the flap 88 when the folding of the flap 88$^a$ has been completed. It is to be seen from this figure that the grip finger 45 has been permitted to come into engagement with the surface of the conveying drum as it passes the pressure roller 102.

As the tube advances from beneath the stationary fold member 100 and after the bottom formation has been compressed by the pressure drum 102 it is then released from the surface of the drum 44 and deflected upwardly by a rigid guide plate 109. The tube is then engaged by a second pair of conveying belts 107 which reverses the tube by guiding it over the upper portion of the drum 102; the drum 102 also serving as a pulley for the conveyer belts 68. The tube will now be disposed between these two pairs of conveyer belts and is transported by them across the top of the machine to a pair of reversing rollers 112 and 113 mounted on the top of the machine and disposed beneath a reversing chute 114 which is rigidly positioned between the bottom folding and top folding mechanisms. A suitable bracket 115 may be secured to the frame member 31 and serve as a support for the reversing chute. The end portions of the reversing roller 112 may also serve as a reversing means for the endless conveyer belts 107. The upper stretch of these belts may pass beneath an adjustable tightening roller 116 suitably mounted on the top of the machine. Thus the conveyer belts 107 travel backward to the pulleys 118, and thereafter pass downwardly and are brought into intimate contact with the tube by pulleys 120.

The other pair of conveying belts may pass downwardly and over suitably mounted pulleys 122 and beneath a tightening pulley 123 and thence pass backward over pulleys 124. These belts are maintained out of contact with the shaft 72 by large pulleys 125 loosely mounted thereon. It is to be noted that both pairs of conveyer belts are positively driven by the impression roller 102, the large drum 44 and pulleys 120; the latter members being driven by gear 120$^a$ which meshes with the gear 103.

The arrangement of the various elements in the top forming mechanism are such that the top folds are narrower than the bottom folds. The diameter of the conveying drum 133 is less than the diameter of drum 44, due to the fact that the tube has been shortened by the formation of the bottom folds. Hence the various creasing, folding and pasting mechanisms are proportionately smaller than the corresponding elements of the bottom forming mechanism.

The feed drum 134 and friction feed rolls 135 cooperate with the stops 131 in feeding the reversed tube to the conveying drum 133, whence the gripping fingers 136 engage one ply of the tube. The opening fold is effected by the movement of the two plies of the tube in the manner hereinbefore described.

As the top fold is shorter the position of the wiper 137 should be relatively higher and closer to the drums 133 and 134 respectively. The pressure roll 138, creasing blades 139 and rotary tucking arm 140 and pressure roll 141 may all be carried on transverse shafts mounted on suitable bearings secured to the side frame member 28 and 30.

The conveying drum gear 129 may be driven by the feed drum gear 142. The shaft 146, on which the last named gear is mounted, may be driven by pinion 143 on the shaft 145 which also carries the pulley 144; the latter being driven from the source of power.

The shafts carrying the pressure roll 138, blades 139, tucking arm 140 and pressure roll 141 may be driven by gears 150, 151, 152 and 153 respectively, each of which may be driven by the large conveying drum gear 141. The rotary tucking arm 140 and oscillating arm 159 are relatively smaller than the corresponding members 90 and 91 of the bottom forming mechanism, due to the fact that the widths of the top folding laps are shorter. The stationary folding member 154 may be an ordinary rod adjustably mounted and rigid with the frame members 30. The oscillating member 153 may be actuated by the lever 154, cam follower 155 and cam 156; the latter being mounted coaxially with the pressure roll 141.

The conveying belts 157 may coact with the surface of the conveying drum 133 a distance equal to half the circumference thereof and thereafter be led over the ends of the pressure roll 141, whence the belts may co-operate with the upper conveyer belts 158 which serve to convey the finished bag to the ejecting rolls 159 which may deposit the finished product in a suitable stacking magazine, not shown.

A removable paste transfer roll 160 may coact with the paste roll 161 which is disposed in the paste tray 162, secured to the end of the bed 27; the latter rolls being driven by the gears 163 and 164 respectively.

Figure 22:
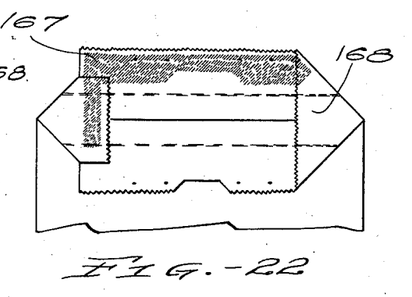
Figure 23:
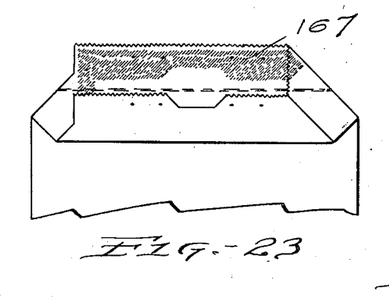
Figure 24:
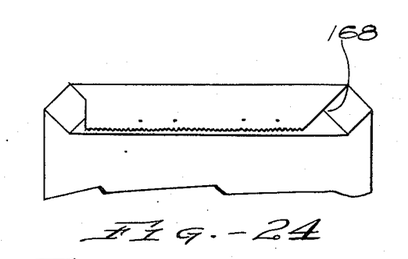

From Figs. 19 to 24, it will be noted that only one longitudinal slit 166 is formed in the tube, while the paste form 149 transfers the adhesive to the folded end of the tube, as outlined by the shaded area 167 in Fig. 22. Hence as the fold is completed, the side fold 168 will remain unpasted; the latter fold thus forms a valve in the top of the bag.

From the foregoing description of our machine, it is readily seen that we have provided a composite mechanism which is adapted to receive a previously formed tube at one end thereof and convey it through successive stages during which various mechanisms disposed along the path through which the tube is conveyed operate on the foremost end of the tube. The bottom formation may be thus rapidly effected during the continuous movement of the tube, after which the tube may be reversed end for end and the top formation may likewise be effected on a foremost end of the tube, while the same is being continuously moved through or past the various mechanisms.

Having thus described our invention, we claim:—

1. In a bag machine of the character described, the combination of an arrangement of means including tube propelling devices affording a pathway for a tube, a bottom and a top forming mechanism adapted to operate on the open ends of the tube including folding and pasting means adapted to operate on said open ends when the tube is propelled along said path, means for connecting and synchronously driving said top and bottom forming mechanism, and means for turning the bag end for end in said path.

2. In a machine for making paper bags from tubes, the combination of a bottom forming mechanism, means for feeding the tube therethrough whereby the bottom is formed on the forward end of the tube, a top forming mechanism, means for feeding the tube therethrough, and means causing the tube to be presented to the top forming mechanism with the open end foremost.

3. In a machine for making bags from tubes, the combination of a bottom forming mechanism, means for feeding the tube therethrough whereby the bottom is formed on the forward end of the tube, a top forming mechanism, means for feeding the tube therethrough, and a reversing mechanism disposed between said bottom forming and said top forming mechanisms for causing the tube to be presented to the top forming mechanism open end foremost.

4. In a bag machine of the character described, the combination of an arrangement of means including conveying devices affording a pathway for a tube, bottom forming mechanism disposed along said pathway adapted to operate on a forward end of the tube, a top forming mechanism also disposed along said pathway and adapted to operate on a forward end of the tube and means for causing the tube to be presented to the top forming mechanism open end foremost consequent to the completion of the bottom formation.

5. In a bag machine of the character described, the combination of an arrangement of means including tube propelling devices affording a pathway for a tube, a bottom and a top forming mechanism adapted to operate on the open ends of the tube including folding and pasting means adapted to operate on each end of the bag when the tube is propelled along said path, means for driving said top and bottom forming mechanism synchronously, and means for feeding the tube into the bottom forming and top forming mechanisms with an open end foremost in each case.

6. In a machine for making paper bags from tubes, the combination of a framed structure, a forming mechanism for one end of the tube, a forming mechanism for the other end of the tube mounted on said frame, a driving mechanism connecting and synchronously driving said bottom and top forming mechanisms, and guiding means presenting the tubes to each of said mechanisms in succession.

7. In a bag machine of the character described, the combination of a bottom forming mechanism, means for feeding the tube therethrough, whereby the bottom is formed on the forward end of the tube, a top forming mechanism, means for feeding the tube therethrough and means including positive driving connections for said top and said bottom forming mechanism whereby they are sychronized.

8. In a bag machine of the character described, the combination of an arrangement of means including tube carrying and propelling devices affording a pathway for a tube, a bottom and a top forming mechanism adapted to operate on the open ends of the tube including folding means having a rotary folder adapted to operate on the folded ends when the tube is propelled along said path, and means for turning the bag end for end in said path, between the action upon the top and bottom.

9. In a machine for making paper bags from previously formed tubes, the combination of an arrangement of means including guiding and conveying means affording a pathway for the tube, means disposed along the pathway for closing the ends of the tube, means in said pathway for reversing the tube end for end whereby said closing means will operate on an open foremost end of the tube, means disposed across said pathway for initiating the movement of the tube in timed relation with said tube closing means and means for connecting and synchronously driving all of the foregoing means.

10. In a bag machine of the character described the combination of an arrangement including propelling and guiding devices affording a pathway for a tube, a bottom and top forming mechanism adapted to operate on the open ends of the tube including folding means having a rotary folder adapted to engage a fold flap of the bottom fold and an oscillating ironer cooperating therewith to complete the fold initiated by the rotary folder as the tube is propelled along said path, means for synchronously driving said top and said bottom forming mechanisms, and means disposed between said last named mechanisms for reversing the bag end for end in said path.

11. In a bag machine of the character described the combination of an arrangement of means including tube propelling devices affording a pathway for a tube, bottom and top forming mechanisms adapted to operate successively on the open ends of the tube, said mechanisms including folding means having, a rotary folder adapted to initiate the final folds of the bottom formation, an oscillating ironer coacting therewith to complete the fold as the tube is propelled along said path, and a stationary folding member adapted to retard the movement of the foremost portion of the tube and cause the folding thereof over the fold completed by said ironer, means for driving said top and said bottom forming mechanisms synchronously and means for turning the bag end for end in said path whereby an open end of the tube is presented to the top forming mechanism.

12. In a machine for making bags from tubes, the combination of a bottom forming mechanism, means for feeding the tube therethrough whereby the bottom is formed on the forward end of the tube, a top forming mechanism, means for feeding the tube therethrough, a reversing mechanism disposed between said bottom forming and said top forming mechanism for causing the tube to be presented to the top forming mechanism, including a chute for guiding the tube to the last named mechanism open end foremost.

13. In a bag machine of the character described the combination of, an arrangement of means including conveying devices affording a pathway for a tube, bottom forming mechanism disposed along said pathway adapted to operate on a forward end of the tube, a top forming mechanism also disposed along said pathway and adapted to operate on a forward end of the tube and means for causing the tube to be presented to the top forming mechanism open end foremost including a deflecting and reversing roll disposed across said pathway.

14. In a bag making machine, the combination of an arrangement of means including tube conveying devices affording a pathway for a tube, a bottom forming and top forming mechanisms including a synchronously driven conveying drum in each mechanism and coacting therewith to effect the bottom and top formations of the bag, belt conveyers forming a part of said conveying devices, means coacting with said belt conveyers for presenting the tube open end foremost to one of said drums.

15. In a bag making machine the combination of an arrangement of means including tube conveying devices affording a pathway for a tube, a pair of synchronously driven conveying drums of different diameters coacting with bottom forming and top forming mechanisms in effecting bottom and top formations of different size at opposite ends of the bag, belt conveyers associated therewith for guiding the tubes over the drums, tube reversing means disposed in said pathway and adjacent said conveyers for presenting the tube open end foremost to one of them, including a reversing and deflecting roll and a guide way therefrom leading to one of the drums.

16. In a bag machine for forming end closures of different size at opposite ends of a tube, the combination of an arrangement of means including tube conveying devices affording a pathway, a pair of synchronously driven conveying drums of different diameters coacting with bottom forming and top forming mechanisms in effecting the large and small bottom and top formations respectively of the bag, belt conveyers associated therewith, tube reversing means disposed in said pathway and between said drums for presenting the tube open end foremost to one of them, said reversing means including a chute constituting part of the pathway, reversing and deflecting roll disposed at the top thereof, the other end of the chute leading to one of the drums whereby the open end of the tube may be presented to one of the drums.

17. In a bag machine of the character described, the combination of a pair of synchronously driven rotary conveying drums adapted to support and convey a paper tube through successive periods in which the bottom and top bag formations are effected, conveying belts cooperating with the drums for guiding the tubes thereover, reversing means associated with the conveying belts whereby the mechanisms will at all times be operating on the foremost end of the tube as it is conveyed through the machine.

18. In a machine for making paper bags from tubes, the combination of a bottom forming mechanism, means for feeding the tube therethrough, a top forming mechanism, means for feeding the tube therethrough, means for causing the tube to be presented to one of said mechanisms with an open end foremost after the other end has been closed, including a reversing means disposed between said mechanisms, and belts for conveying the tube to said reversing means after one end thereof has been closed.

19. In a machine for making paper bags from tubes, the combination of means for closing the bottom and top of a previously formed tube, said means comprising a mechanism for closing one end of the tube and a mechanism for closing the top end of the tube, a tube reversing device disposed intermediate said mechanisms, and driving gearing connecting both mechanisms whereby they may be driven in synchronism.

20. In a machine for making paper bags having different end closures of the character described, the combination of a rotary conveying drum adapted to convey a paper tube through successive stages during which the bottom formation is being effected by bottom-forming mechanisms arranged about the perimeter thereof and coacting therewith, means for reversing the tube relative to its ends, said means being disposed between said described drum and a similar group of mechanisms adapted to act upon the reversed end of the tube to form a valve end or a top.

21. In a machine of the character described, the combination of a rotary conveying drum adapted to support and convey a paper tube and co-operate with successive groups of mechanisms arranged about the perimeter thereof which are adapted to successively slit the tube longitudinally, to form diagonal creases therein extending from said slits, transversely crease the tube, open said creased and slitted end and to paste and close said open end and effect the closing thereof, means disposed between said conveying drum and a second conveying drum for reversing the tube end to end, said latter drum being adapted to convey the tube through similar successive stages of slitting, creasing, opening, pasting and folding operations, whereby the tube is formed into a double end closed bag having a valve opening provided in the top folds thereof.

22. In a bag machine for making paper bags from tubes, the combination of a frame structure, an arrangement of means including tube propelling devices affording a pathway for the tube, a bottom and a top forming mechanism adapted to operate on the open ends of the tube including folding and pasting means mounted on the frame, a mechanism for connecting and synchronously driving said top and bottom forming mechanisms, and guiding means for presenting the tubes to each of said mechanisms in succession including means for turning the bag end for end in said path.

23. In a machine for making paper bags from tubes, the combination of a framed structure, a bottom forming mechanism mounted thereon, means for feeding the tube therethrough whereby the bottom is formed on the forward end of the tube, a top forming mechanism mounted on said frame, means for feeding the tube therethrough, and means causing the tube to be presented to the top forming mechanism with the open end foremost including a reversing mechanism associated with said top forming and said bottom forming mechanisms.

24. In a machine for making bags from tubes, the combination of a framed structure, a bottom forming mechanism mounted thereon, means for feeding the tube therethrough whereby the bottom is formed on the forward end of the tube, a top forming mechanism mounted on said frame, means for feeding the tube therethrough, a reversing mechanism disposed between said bottom forming and said top forming mechanisms for causing the tube to be presented to the top forming mechanism open end foremost, and means supported by said frame for synchronously driving said top forming and said bottom forming mechanisms.

25. In a machine for making bags from tubes, the combination of a frame structure, a bottom forming mechanism mounted thereon, means for feeding the tube therethrough whereby the bottom is formed on the forward end of the tube, a top forming mechanism mounted on the frame, means for feeding the tube therethrough including conveying drums having means mounted thereon for gripping the said foremost ends of the tube, and means rigid with said frame for controlling the gripping action of said last named means.

26. In a machine for making bags from tubes, the combination of a frame structure, a forming mechanism for one end of the tube, a forming mechanism for the other end of the tube mounted on said frame including rotatable conveying drums having means mounted thereon for gripping the foremost ends of the tube, cam members rigid with the frame for controlling the gripping movement, driving mechanism connecting and synchronously driving said drums, and guiding means including reversing mechanism for presenting the tube open end foremost to each of the drums in succession.

27. In a machine of the character described, the combination of a bottom forming mechanism, a top forming mechanism, means for feeding the tube therethrough and for reversing the tube whereby the tube is presented to said bottom forming and said top forming mechanism open end foremost, said top forming and bottom forming mechanism having conveying drums, means cooperating with said drums for slitting and diagonally creasing the ends of said tube and means for connecting and synchronously driving said last named means.

28. In a bag machine of the character described, the combination of an arrangement of means including tube conveying devices affording a pathway for a tube, bottom forming and top forming mechanisms adapted to operate on the open ends of the tube including conveying drums, reversing means disposed therebetween, and conveying belts cooperating with the drums over a substantial distance of the circumference thereof whereby the tube may be maintained in intimate contact with the drum surfaces during the period in which the final pasting and folding of the bottom and top formations are effected.

29. In a machine for making paper bags from tubes, the combination of a frame structure, bottom forming and top forming mechanisms mounted thereon, a tube reversing means disposed between said mechanisms comprising deflecting and reversing rolls disposed across the path of the tube and a chute associated therewith for guiding the tube to said top forming mechanism.

30. In a machine for making paper bags from tubes, the combination of a top forming mechanism, a bottom forming mechanism, means for feeding the tube to the respective mechanisms open end foremost including synchronously driven feed rolls, said mechanisms having drums comprising rotary folding beds having gripping fingers mounted thereon, and cooperating with the synchronously driven feed rolls which are adapted to engage the open ends of the tube and maintain said ends in contact with the surfaces of the drums during a period in which said grippers engage one ply of the tube.

31. In a bag making machine of the character described, the combination of an arrangement of means including tube carrying and propelling devices affording a pathway for a tube, a bottom forming mechanism and top forming mechanism disposed along said pathway including rotary conveying drums and a tube reversing mechanism disposed between the drums, said drums being adapted to convey a paper tube through successive stages during which a longitudinal slitting and diagonal creasing is being effected on the open ends of the tube, feed rolls cooperating with the drums in effecting said slitting and diagonal creasing, driving means connecting said feed rolls and gearing connecting said feed rolls with the drums whereby said drums and said feed rolls are respectively driven in synchronism.

32. In a machine of the character described, the combination of a bottom forming mechanism, a top forming mechanism, means for feeding the tube to the respective mechanisms open end foremost including reversing means disposed between said mechanism and means for connecting and synchronously driving said mechanisms, said mechanisms including rotary conveying drums and feed drums adapted to support and convey a paper tube and cooperate successively with groups of mechanisms arranged about the perimeters thereof in forming longitudinal slits in the ends of the tube, diagonal creases extending from the slits to the sides of the tube, and transverse creases across the tube whereby one ply of the tube may be folded while the other ply is maintained in contact with said drums.

33. In a bag making machine of the character described, the combination of an arrangement of means including tube carrying and propelling devices affording a pathway for a tube, a bottom forming mechanism and top forming mechanism disposed along said pathway including rotary conveying drums and tube reversing mechanism disposed between the drums, said drums being adapted to convey a paper tube through successive stages during which an open fold and pasting operations are being effected on the open ends of the tube, conveyer belts cooperating with the drums during said operations to prevent slippage of the tube, and driving means connecting said drums and said belts whereby the drums and belts are driven in synchronism.

34. In a machine for making paper bags from tubes, the combination of a top forming mechanism, a bottom forming mechanism, means for feeding the tube to the respective mechanisms open end foremost, said mechanisms including drums comprising rotary folding beds having gripping fingers mounted thereon, rotary folding members adapted to initiate the final closing folds on the tube ends and conveyer belts cooperating with said drums to prevent slippage of the tube when said closing folds are being effected.

35. In a machine for making paper bags from tubes, the combination of a frame structure, bottom forming and top forming mechanisms mounted thereon including conveying drums, conveyer belts cooperating with the drums, in moving the tube through successive pasting and folding operations, a tube reversing means disposed between said mechanisms comprising deflecting and reversing rolls associated with said conveyer belts and disposed across the path of the tube and a chute adapted to receive the reversed tube and guide it to said top forming mechanism.

In witness whereof, we hereunto affix our signatures.

GEORGE T. TRUNDLE, Jr.
BURTON G. CARLSON.